Jan. 26, 1965 C. W. BIRCH ETAL 3,167,268
AUTOMATIC CUT-OFF WEB WINDER APPARATUS
Filed Jan. 22, 1962 12 Sheets-Sheet 2

Inventors
Clifford W. Birch,
Richard Briggs
by Munro V. Hamilton Attorney

Inventors
Clifford W. Birch,
by Richard Briggs
Attorney

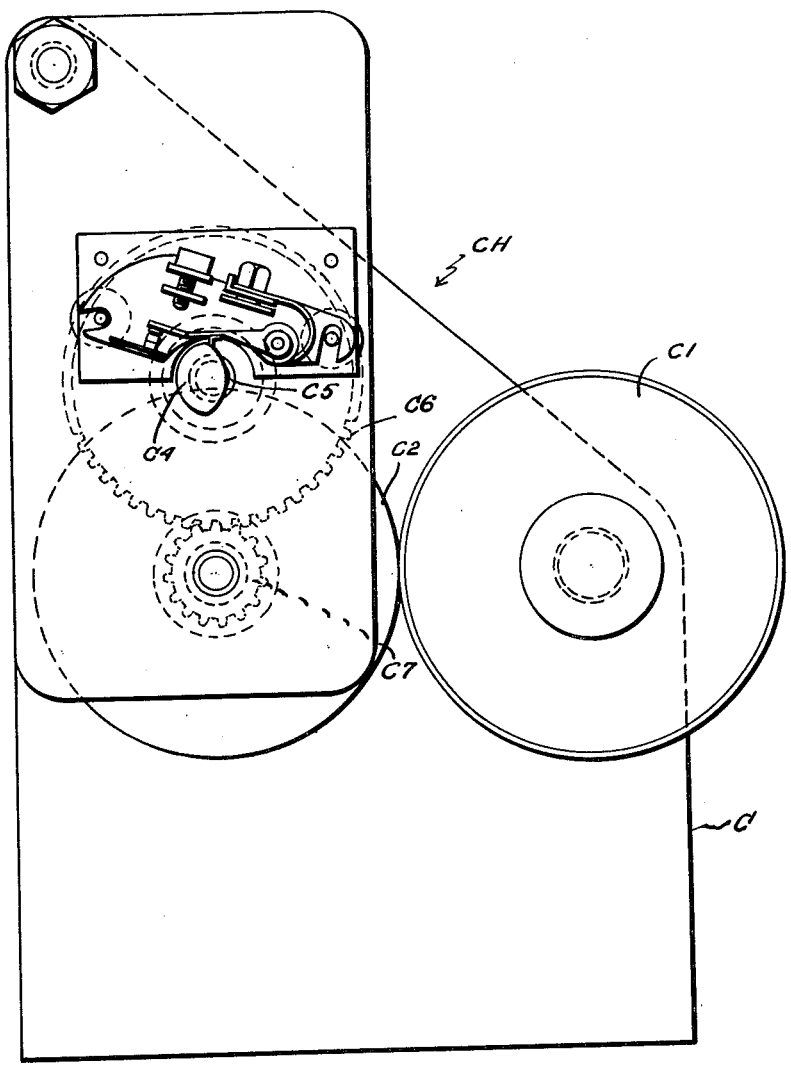

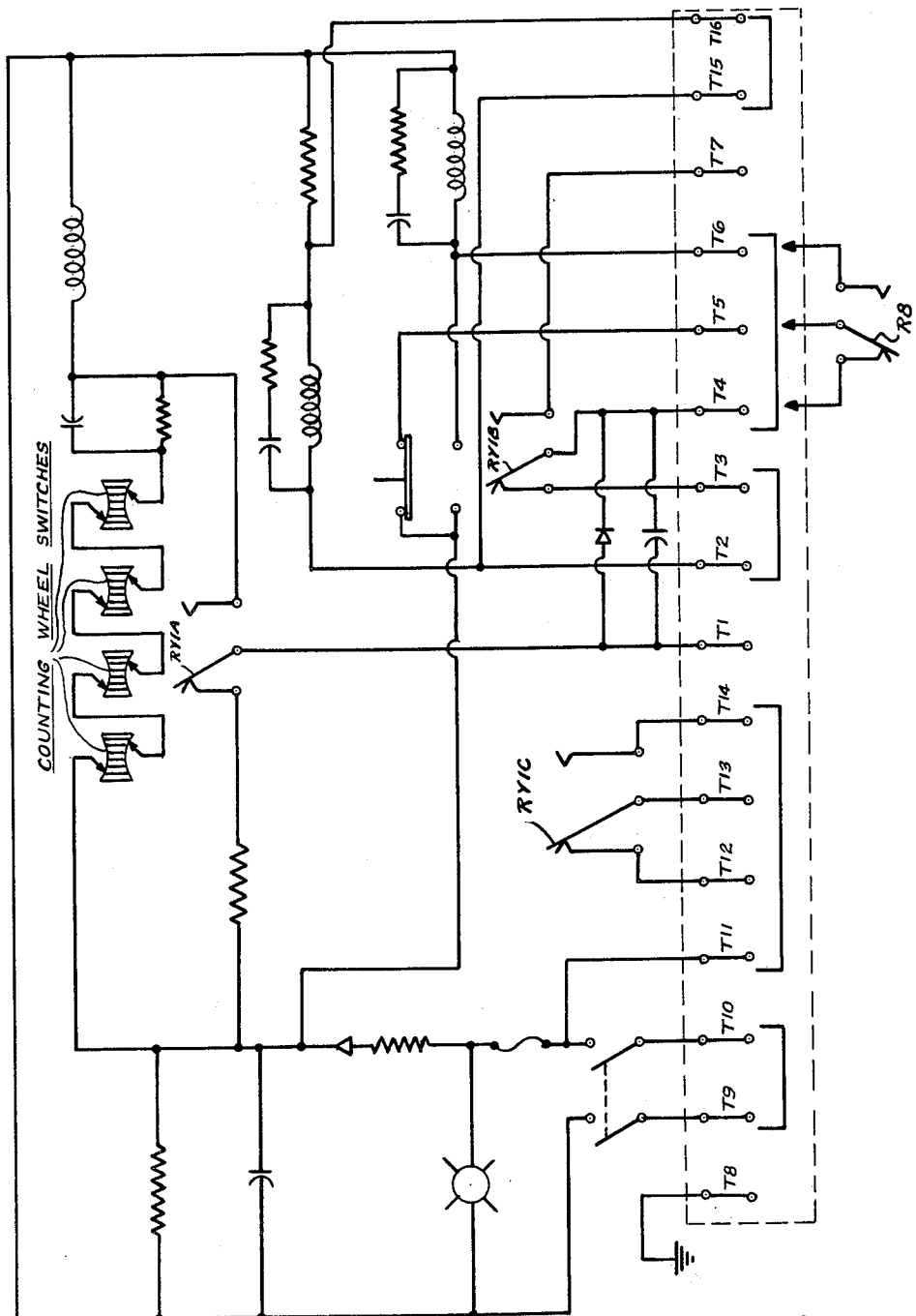

United States Patent Office 3,167,268
Patented Jan. 26, 1965

3,167,268
AUTOMATIC CUT-OFF WEB WINDER APPARATUS

Clifford W. Birch, Lexington, and Richard Briggs, Reading, Mass., assignors to Birch Brothers, Inc., Somerville, Mass., a corporation of Massachusetts
Filed Jan. 22, 1962, Ser. No. 167,771
16 Claims. (Cl. 242—56)

This invention relates to improvement in apparatus for web winding wherein a continuous web of cloth or other sheet material is furnished from a source of supply and is wound about a cylindrical shell to obtain a roll of a predetermined size. The present application is a continuation-in-part of our co-pending application Serial No. 31,085 filed May 23, 1960, now Patent No. 3,047,248.

In the co-pending application noted above, we have disclosed a web winding machine of the three-roll type wherein a primary winding operation takes place on a first and second roll and thereafter the partly wound roll is automatically transferred to a second and third roll where the secondary winding is completed. These winding operations are of a semi-automatic nature and are carried out with a special jaw mechanism including two sets of jaws which exert pressure during both the primary and secondary stages of winding. The two sets of jaws are controlled by fluid pressure devices and operate in a predetermined sequence so as to exert a downward pressure while becoming displaced vertically upwardly as the diameter of the cloth roll increases in each of the two stages of winding.

The present invention is also concerned with a two-stage apparatus of web winding in which a three-roll type of web winding machine is employed and a jaw mechanism is employed to exert substantially constant downward pressure, and a further objective of the invention is to carry out a continuous winding operation in a completely automatic fashion. The automatic winding process of the invention includes such steps as automatically feeding cloth winding shells into an operative position and mechanically lapping an end of cloth about the shell, applying a fresh shell against a partly wound roll to effect a transfer of the partly wound roll from one position to another, detecting the presence of seams in a web which is being wound, counting the yards of cloth which is being wound during a given period of time, and predetermining the size of a roll which is to be wound, together with the further steps of automatically cutting cloth and doffing a completed roll.

The nature of the invention and its other objects and novel features will be more fully understood and appreciated from the following description of a preferred embodiment of the invention selected for purposes of illustration and shown in the accompanying drawings in which:

FIGURE 15 is a detail view of the counter mechanism; and

FIGURE 16 is a wiring diagram for the counter means of the invention.

In carrying out the invention, we have devised a method of winding which we refer to as a method of "Robot Winding." The term, robot winding, is intended to define and include a method which is carried out automatically in all of its aspects other than at the point where cloth is first introduced into the machine and manually lapped about the first shell.

These automatic operations include mechanically depositing shells in the jaw mechanism of the machine, employing a deposited shell to act as a transfer roll, automatically shifting a roll at a predetermined size from a primary winding position into a secondary winding position, measuring and cutting the cloth web at predetermined points to control the size of the roll and also to measure the total length of cloth handled and finally lapping a cut end of cloth around a newly placed shell to repeat this cycle of operation in conjunction with a doffing operation.

Figure 10:
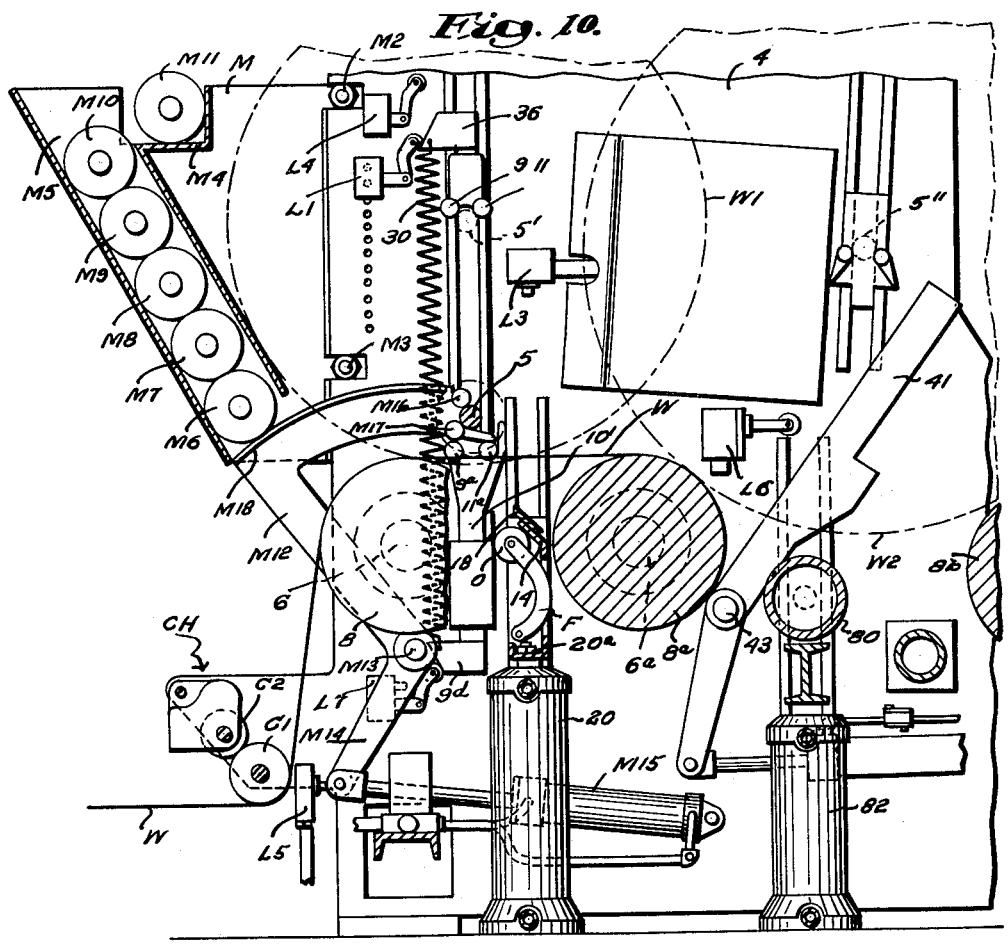
FIGURE 10 is a detail cross sectional view illustrating the shell magazine and shell feeding mechanism in a position in which the shell is entered into engagement with the shell retaining position of the machine.
Figure 11:
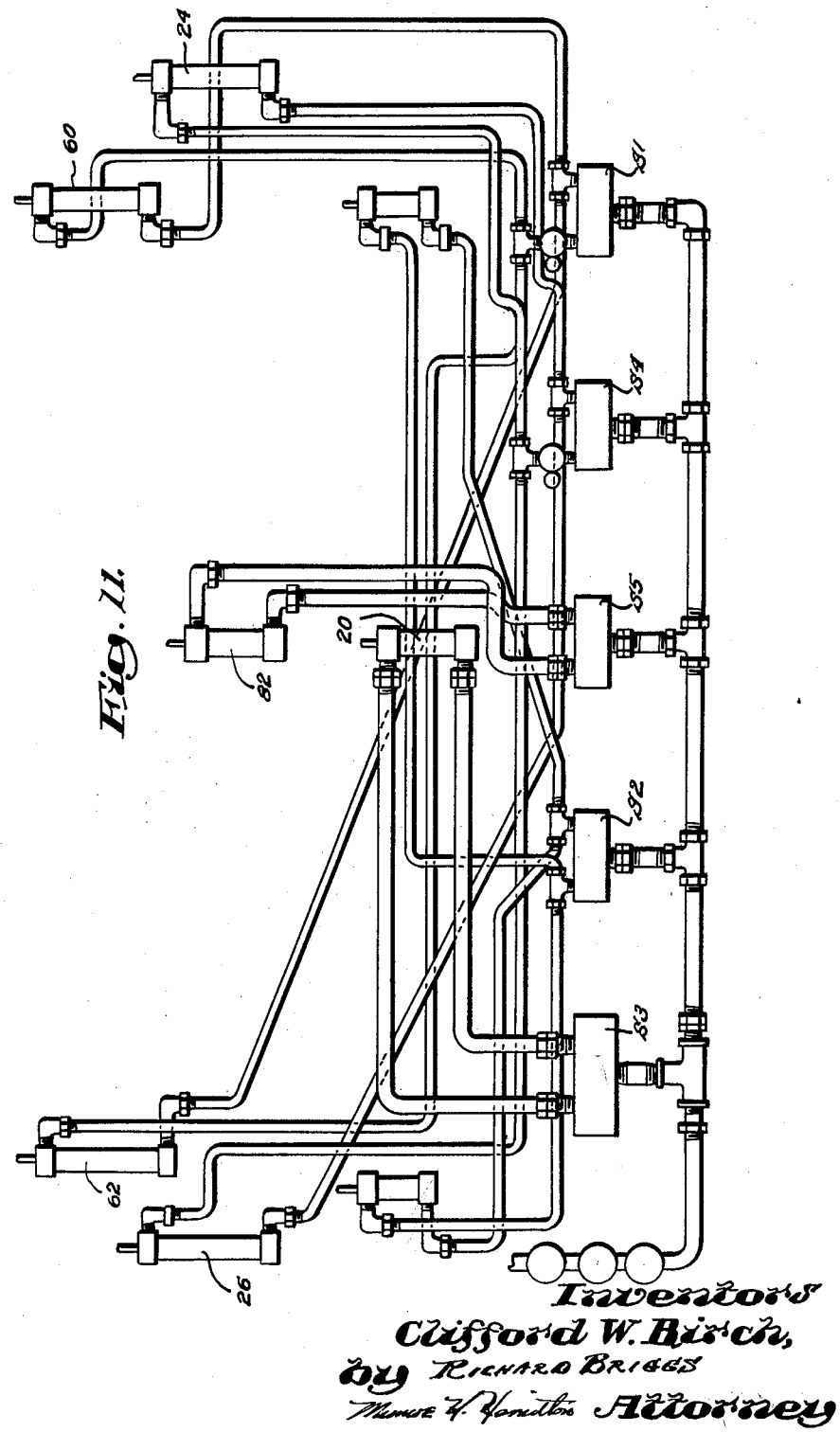
FIGURE 11 is a diagrammatic view illustrating fluid pressure control means for operating portions of the machine.
Figure 13:
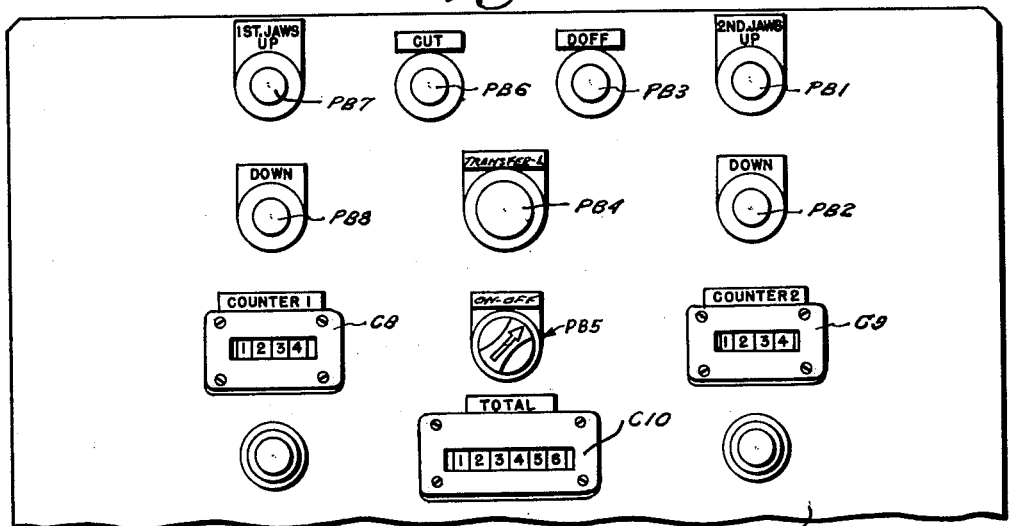
FIGURE 13 is a view of a control panel used in operating the machine.
Figure 14:
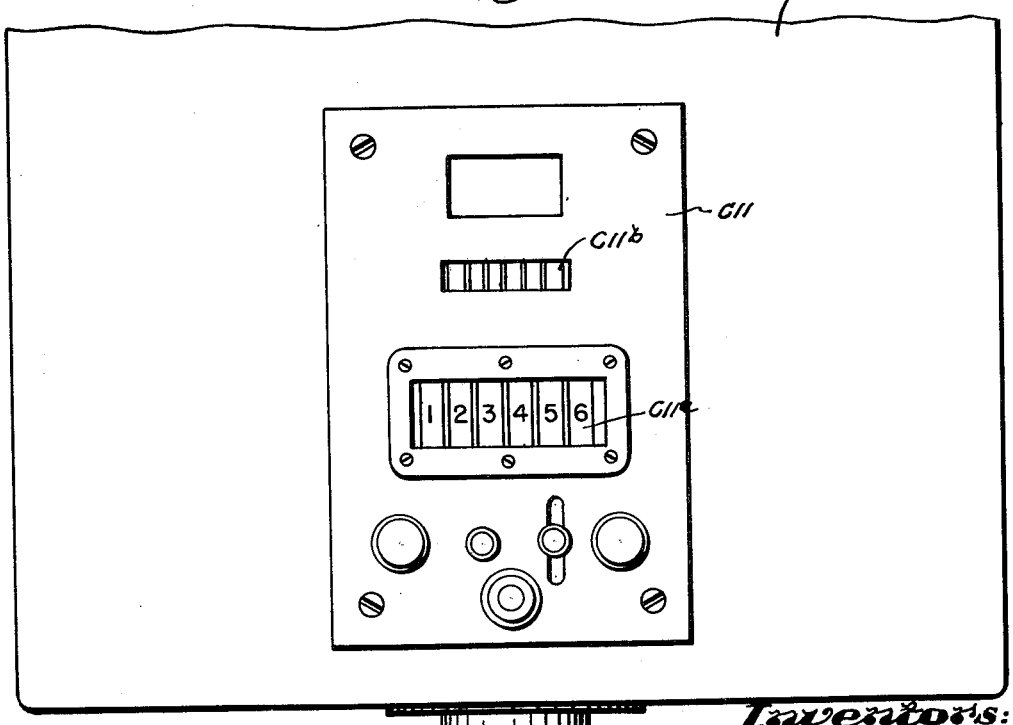
FIGURE 14 is another view of the control panel.

The apparatus which we have devised for carrying out our method of robot winding is made up of three principal parts, including the cloth handling mechanism proper (FIGURES 1 to 10); electromechanical fluid pressure actuating devices built into or associated with the cloth handling mechanism shown schematically in FIGURE 11; and a separate control console in which are mounted various control devices which function as a robot brain for directing essentially all the movement of the cloth handling mechanism. The console includes a novel arrangement of counting devices, relays, and push buttons as illustrated in FIGURES 13 and 14.

A detailed description of the cloth handling operations and the mechanism for carrying out these operations will first be described and thereafter the arrangement and functioning of the devices shown in FIGURES 11 and 12 will be discussed in detail in connection with a typical operating cycle of the machine.

In one preferred form the robot winding method of the invention is based on the concept of maintaining on hand in a suitable magazine a supply of shells whereby successive shells may, at predetermined intervals, be automatically fed from the magazine into a primary winding position directly above a first winding drum. In combination with the magazine there is further provided novel seam detecting and counter mechanisms. The counter mechanism may be employed to control parts of the machine operation in a novel manner, and preferably includes a total yardage counter referred to as a "lot" counter, as well as two individual roll yardage counters referred to as "batch" counters, and a predetermining counter which may be preset for a desired roll yardage.

Figure 6:
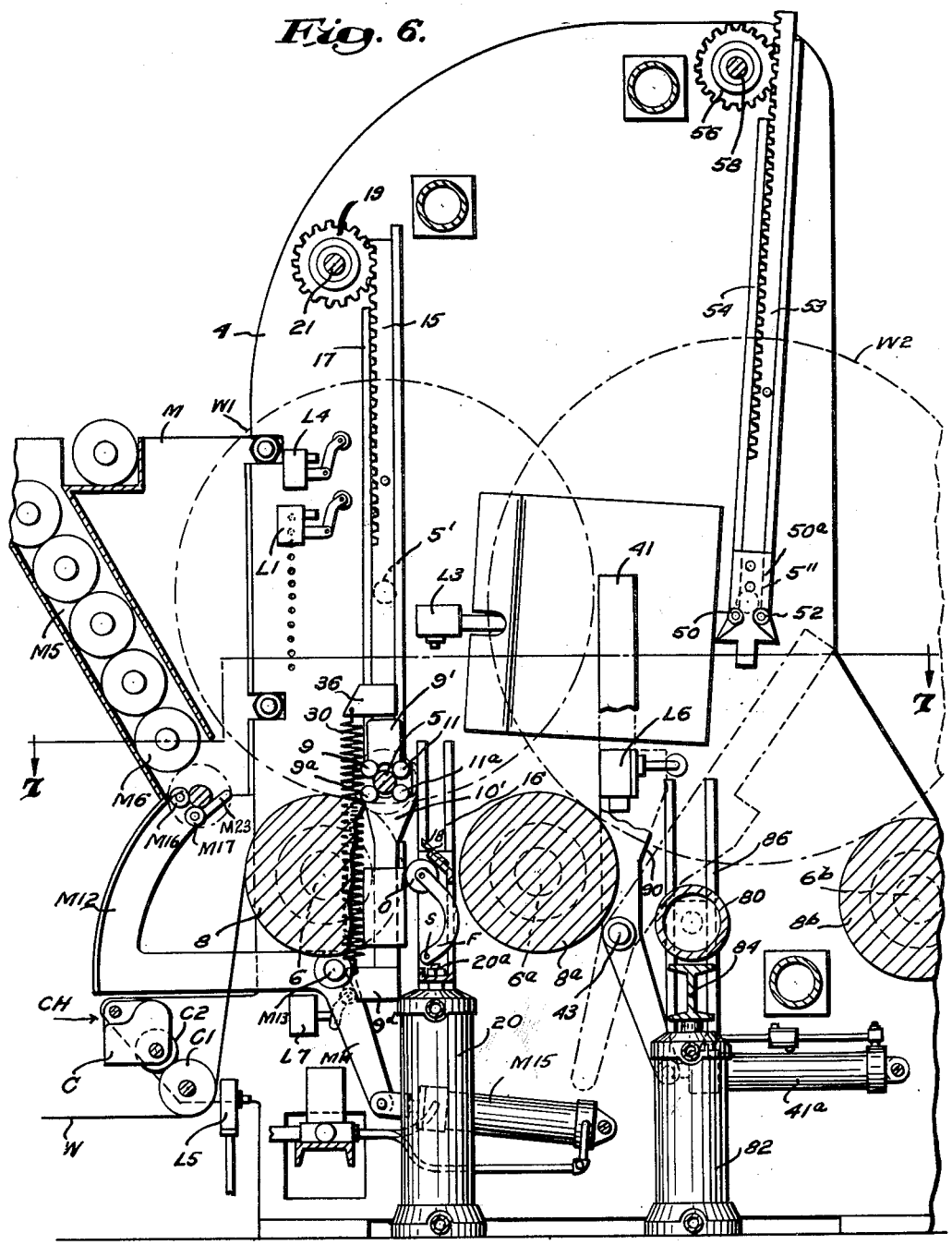
FIGURE 6 is a vertical cross sectional view taken just inside of the machine and further illustrating in greater detail the shell magazine and shell retaining jaw mechanism.
Figure 7:
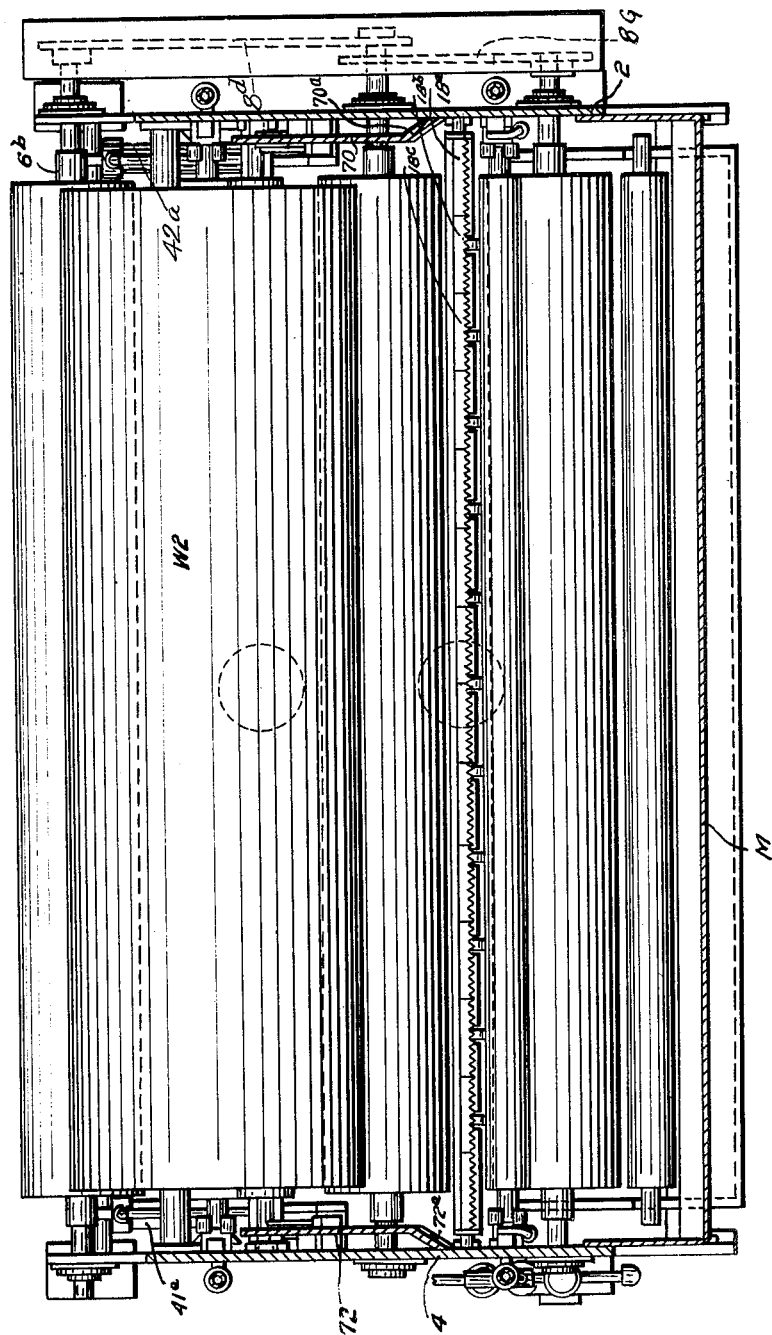
FIGURE 7 is a plan cross sectional view taken approximately along the line 7—7 of FIGURE 6.

Considering these parts more in detail, attention is directed to FIGURES 1–10 inclusive. As shown therein numerals 2 and 4 indicate a pair of spaced vertical machine sides. These vertical sides are secured in some convenient manner as by transverse braces 3 shown in FIGURE 1 and have supported on the inner sides thereof jaw mechanisms. Also secured between the sides 2 and 4 are driving roll shafts 6, 6a and 6b on which are mounted respective driving rolls 8, 8a and 8b. These rolls are actuated by motor driven sprocket chains 8c and 8d (FIGURE 7). Rolls 8 and 8a provide roll support for primary winding while rolls 8a and 8b are adapted to receive a partly wound roll transferred from rolls 8 and 8a and to support the partly wound roll while secondary winding takes place.

Figure 3:
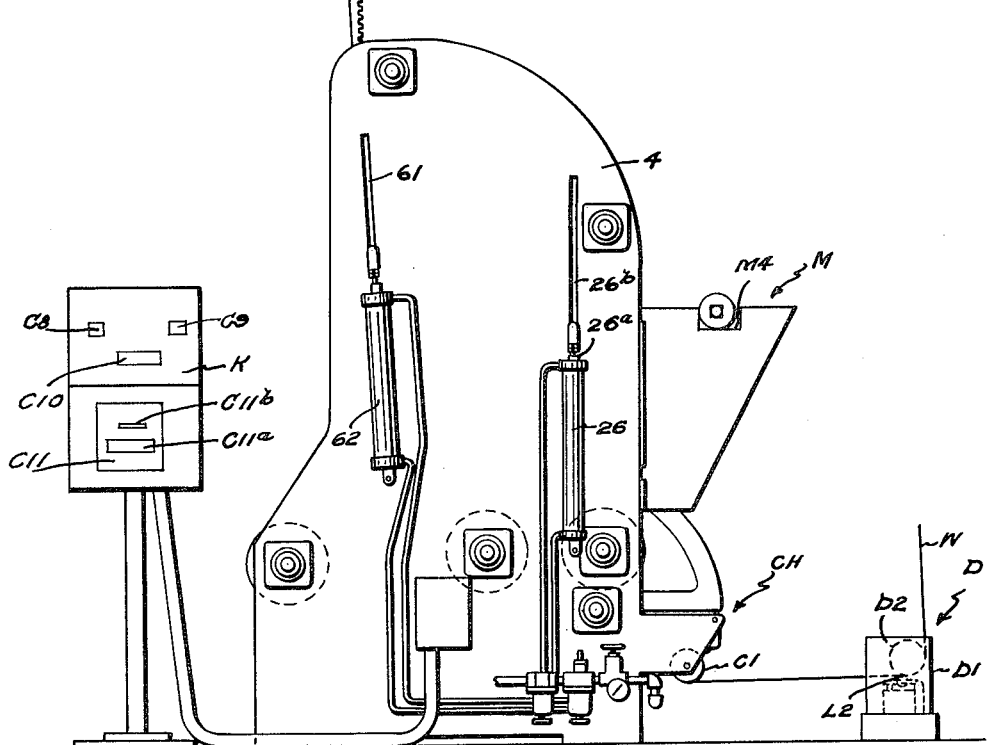
FIGURE 3 is an elevational view illustrating one side of the machine and further indicating seam detecting and counter mechanism through which a web of material to be wound is passed.

As illustrated in FIGURE 3, a web of cloth W furnished from a suitable supply source, is led through a seam detector D, then to a counter device C, and then between the machine sides to a cylindrical shell 5. The latter member is normally supported in jaw members which are mounted at opposite inner sides of the members 2 and 4.

The seam detecting apparatus is located a short distance away from the entering side of the frame as shown at the right hand side of FIGURE 3 and guides the web W along a horizontal path of travel to a counter head generally denoted by the arrow CH. The counter head CH is secured at the entering side of the frame as shown in FIGURE 3.

Figure 4:
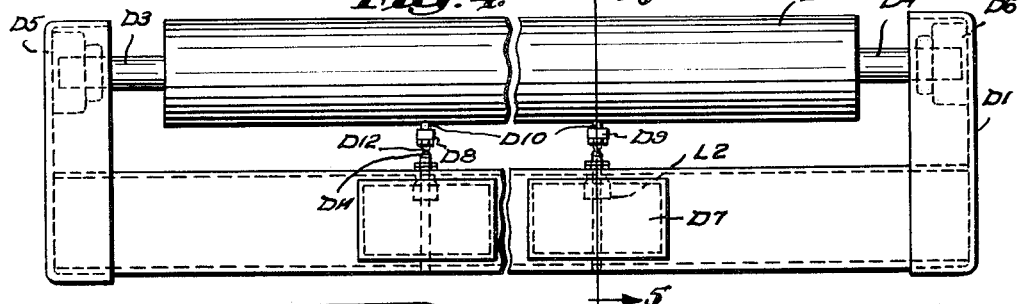
FIGURE 4 is a detail elevational view of the seam detecting apparatus shown at the right hand side of FIGURE 3.
Figure 5:
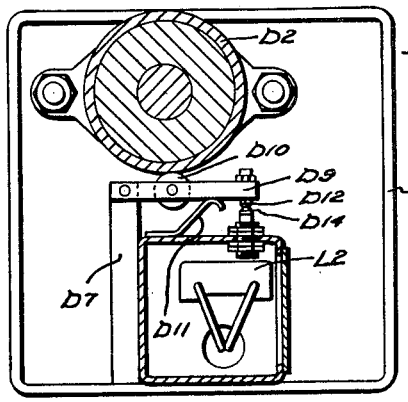
FIGURE 5 is a cross section taken on the line 5—5 of FIGURE 4.

In detail the seam detecting apparatus consists in a casing D1 in which is supported a roll D2 having journal portions D3 and D4 horizontally received in bearings D5 and D6 as best shown in FIGURE 4. At the lower side of the casing D1 are roll stands D7 having roller arms D8 and D9 pivotally mounted therein and resiliently supported by springs as D11. Small rolls D10 are rotatably received in the roller arms D8 and D9 and normally maintain the contacts D12 and D14 of a limit switch L2 in an open position as suggested in FIGURE 5. When a seam in the web W passes between the rolls D2 and D9, the switch L2 is actuated as described in detail at a later point in the specification.

The web of cloth W after passing through the seam detector mechanism described, advances along a horizontal path of travel to the counter head CH (FIGURE 3) which includes a frame C, a guide roll C1 (FIGURE 10) and a measuring roll C2 mounted in frame C in rolling contact with the guide roll C1. The counter head CH includes an electrical switch further illustrated in FIGURE 15 and operated by a cam C4 on a shaft C5. The shaft C5 carries a gear C6 in mesh with a gear C7. The latter gear revolves with the measuring roll C2 and causes the cam C4 to close a switch once for every yard of cloth which passes by the measuring wheel C2.

In this way an electrical signal is transmitted to a multi-counter register mechanism which may, for example, be mounted in a control console K as shown in FIGURE 3 and also FIGURES 13 and 14. The multi-counter register mechanism includes a lot counter C10, two batch counters C8 and C9, and predetermining counter C11 as shown in FIGURES 13 and 14. These devices are electrically connected as indicated in FIGURE 16 so that a yardage total is kept by the lot counter and alternate counts are made at the batch counters for each roll of cloth which is wound. Conventional means for resetting the batch counters are also provided.

As shown in FIGURE 6, the web W, after leaving the counter device, passes over the primary winding roll 8 and is wound around a shell 5. This may be done by hand lapping the edge of the web about the shell when a winding operation is being initiated. At all other times it is carried out automatically as hereinafter described. The shell 5 is deposited in an operative position in the machine by means of novel shell feeding mechanism of the invention. Considering in greater detail this shell feeding mechanism, attention is directed to FIGURES 6, 9 and 10. As shown therein, we provide at the entering side of the winding machine, a shell magazine M which may, for example, comprise an inclined hopper. This hopper is of the shape shown in the drawing and extends across the entering side of the machine. The magazine M is secured to the frame sides in some convenient manner as by means of fastenings M2 and M3.

At its upper side magazine M is formed with a shelf M4 which is of a size adapted to receive a shell thereon and which leads into a discharge chute M5 constructed of a length generally corresponding to the length of a shell and of a width slightly exceeding the shell diameter whereby a series of shells M6, M7, M8, M9 and M10 may be loosely supported one upon another in the position shown in FIGURES 6 and 10. The discharge chute M5 is open at its lower portion to provide an elongated discharge opening through which a bottom shell may drop out.

Cooperating with this discharge chute M5 is a pair of transfer arms M12 which are pivotally mounted at the machine sides on shaft M13. Each arm, at its lower extremity, is formed with extensions as M14 which are pivotally connected to fluid pressure cylinders as M15. At their upper ends the transfer arms are formed with shell retaining fingers as M23 and rollers as M16 and M17. These rollers in the retracted position of the transfer arms, shown in FIGURE 6, are adapted to receive opposite ends of a shell which is dropped out of chute M5.

When the hydraulic cylinders M15 are actuated, the arms are pivoted forwardly and a shell is carried to a position of engagement with the shell retaining jaw mechanism at the inner sides of the members 2 and 4. The transfer arms M12 at their upper side are further provided with a curved closure plate M18 which extends between the two arms so as to substantially close the bottom of the discharge chute M5 in an advanced position of the arms as shown in FIGURE 10. The closure plate thereby prevents shells in the magazine chute from dropping out during the loading operation.

The shell shown being first deposited in the jaws by the transfer arms M15 in FIGURE 10, is denoted by the numeral 5. As shown in this figure, the shell journals have come into contact with a pair of lower first jaws and at this time a pair of upper first jaws are maintained in a raised position to permit the shell journals to be inserted. This first set of jaws include a pair of spaced-apart upper roller elements 9 and 11, and a set of lower spaced-apart roller elements 9a and 11a. The spacing of these rollers is such that the shell journals may be rotatably supported therebetween.

It will be understood that the transfer arms are electrically controlled as hereinafter described and at a selected point return to the position of FIGURE 6 to receive another shell. When thus retracted and loaded with another shell, the transfer arms may, I find, be employed to carry on a further function of transferring a partly wound roll of cloth from a primary winding position to a secondary winding position as suggested in FIGURE 9. Transfer in accordance with the invention is accomplished by electrically controlling the movement of the first jaws and fluid pressure cylinders M15 in timed relationship so that the cylinders operate at a point after the jaws are opened and where a required period of winding has been accomplished in the primary winding position. At such a point the shell carried in the transfer arms is brought into contact with the partly wound roll and operates to transfer this member from a primary winding position into a secondary winding position as noted by the broken line showing of the partly wound roll in FIGURE 9.

Figure 8:
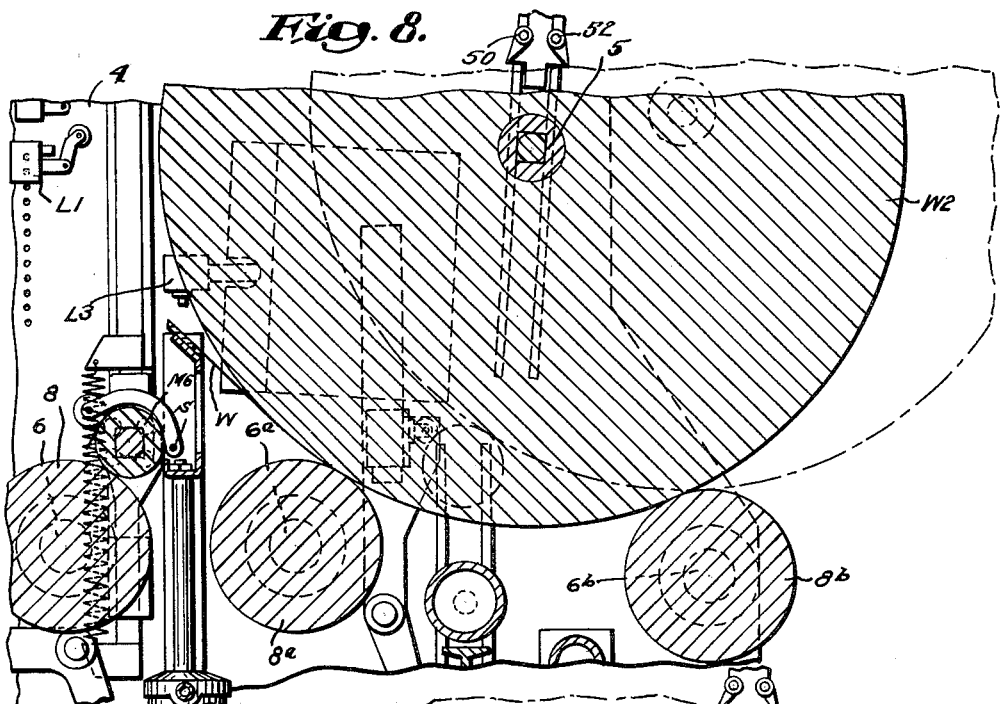
FIGURE 8 is an enlarged detail sectional view showing a cloth roll in a partly wound position where secondary winding may take place.
Figure 9:
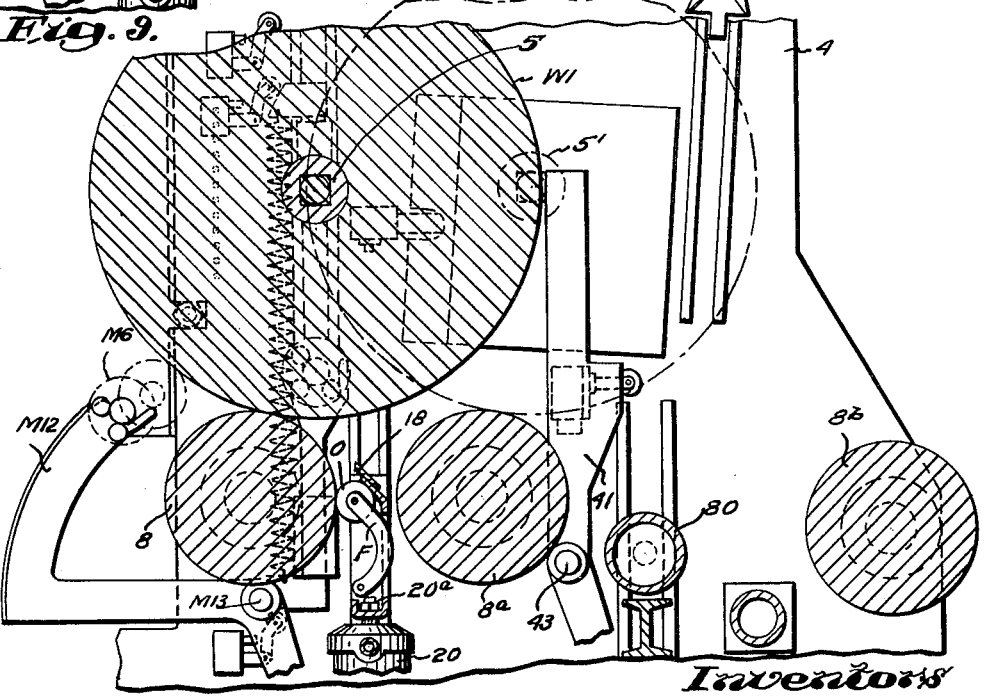
FIGURE 9 shows a roll of cloth partly wound as it occurs during the primary winding stage in the machine.

In the position of shell 5, shown in FIGURE 10, it will be observed that the shell 5 is not in contact with the driving roll 8. In FIGURE 6 the shell 5 is shown lowered into engagement with the driving roll 8. In FIGURE 9 the shell 5 is shown in an intermediate position after primary winding has taken place. In FIGURE 8 the shell 5 is shown at a time when the secondary winding operation has been carried out, the web has just been cut and a cut end of the web has lapped around a new shell.

Figure 1:
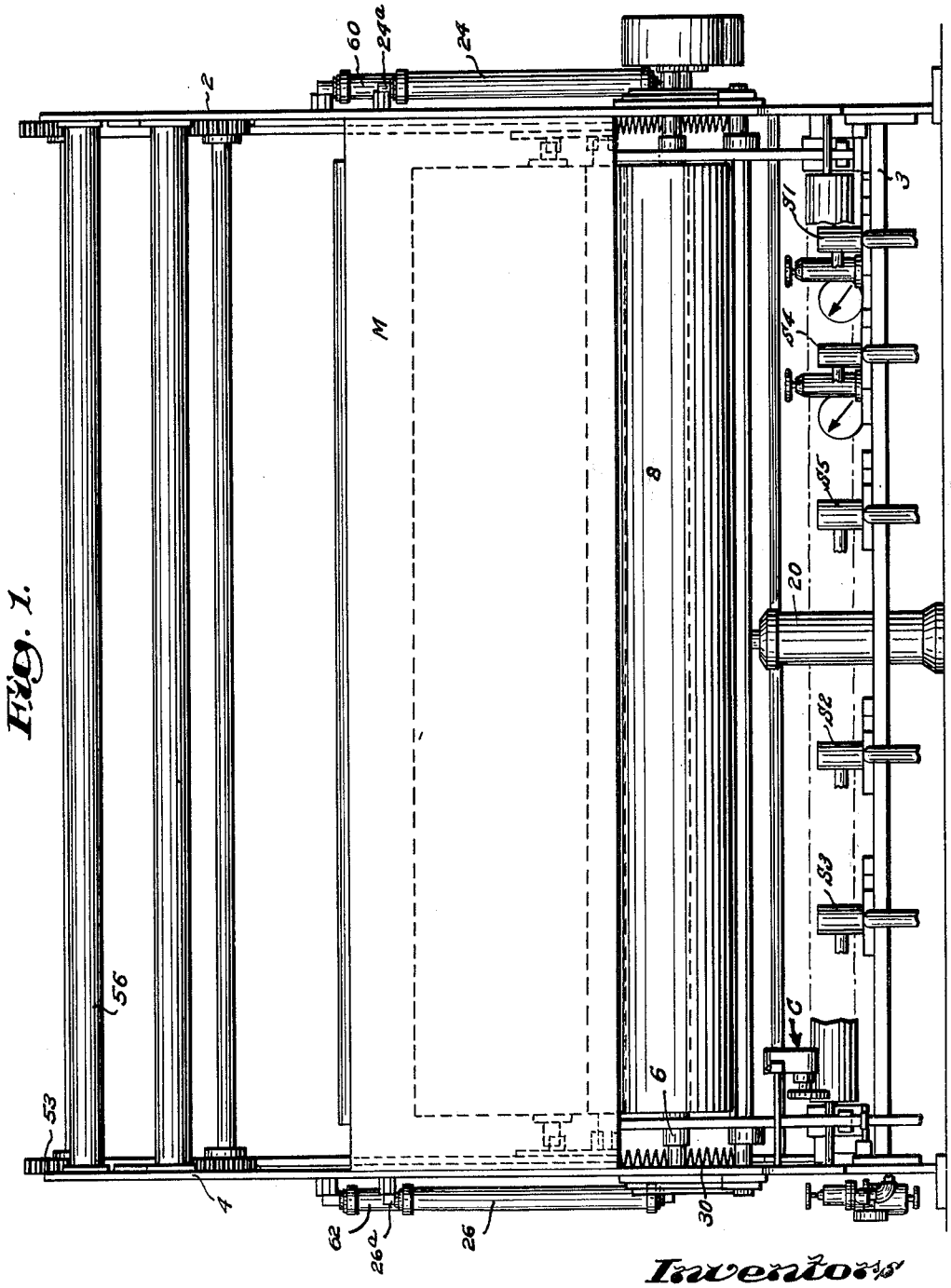
FIGURE 1 is an elevational view showing the front or cloth entering end of the machine of the invention.
Figure 2:
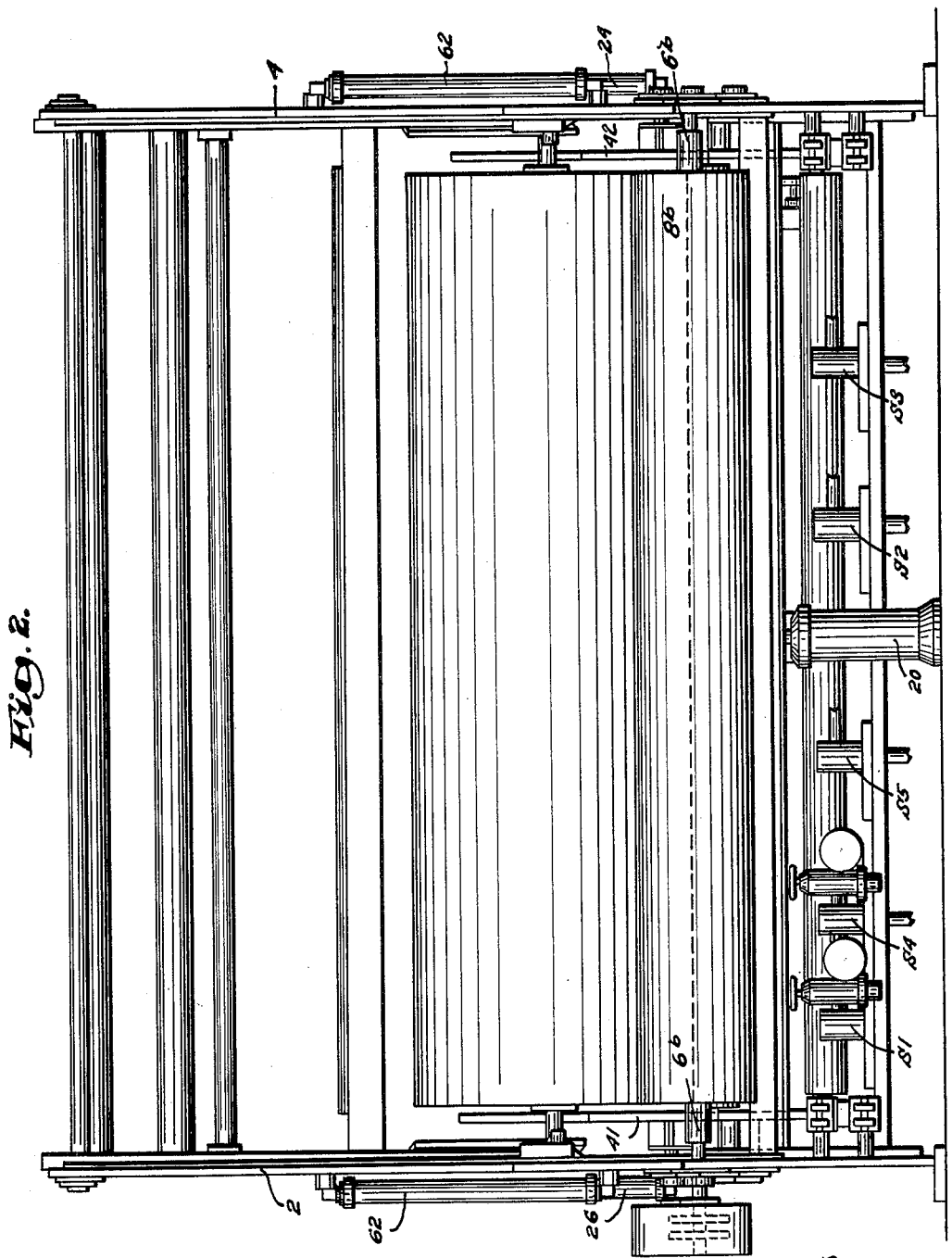
FIGURE 2 is an elevational view showing an opposite or delivery end of the web winding machine.

To provide for the various changes in position of the shell 5, while at the same time exerting a yieldable downward pressure on the opposite journal portions of the shell 5, we support the first set of jaws for vertically sliding movement at opposite inner surfaces of the frame sides and we exert yieldable downward pressure by means of two fluid actuated cylinders 24 and 26 which are located externally of the frame sides as shown in FIGURES 1 and 3. The fluid cylinders may, for example, be of the pneumatically actuated type and are supported in an upright position with vertically reciprocating plunger extremities 24a and 26a occurring at the upper ends of the respective cylinders. A supply of compressed air is controlled by a solenoid S1 shown in FIGURE 1.

The plunger extremities 24a and 26a support connecting arms which extend through slots as 26b in the frame sides 2 and 4 to connect with vertically reciprocating bars at the inside of the respective frame sides 2 and 4. These bars are preferably constructed in the form of rack elements as shown in FIGURE 6 and one of them is denoted by numeral 15. Channel means for guiding one of the rack elements is indicated at 17.

It will be understood that a similar rack and channel assembly is provided at the opposite frame side 2. Each of these rack elements 15 has fixed thereto roller jaw supports as 9' in which are rotatably mounted upper roller jaws as 9 and 11 (FIGURE 10). When the cylinders 24 and 26 are actuated, these upper roller jaw supports, together with jaws 9 and 11, are caused to move up and down into different positions of adjustment.

Immediately below the upper roller jaw supports 9' are slidably supported lower roller jaw supports as 10' in which are rotatably mounted the lower roller jaws 9a and 11a as best shown in FIGURE 6. At the lower extremities of the roller supports 10' are provided stop members as 9d. Anchored to the stop means 9d are coiled springs as 30 which extend upwardly and are fastened at their upper ends to respective projecting parts as 36 extending outwardly from the members 15. Similar lower jaw structure is provided at the frame side 2.

By means of this arrangement the lower jaw supports 10' are resiliently held in contact with respective upper jaw supports 9' to locate the two sets of jaws in suitably spaced relationship to receive and hold the journals of the shell 5 in a position such as that shown in FIGURE 9. In this position the stops 9d are not engaged. However, by means of the arrangement described it will be observed that each set of jaws 9, 11, 9a, 11a, may be raised as a unit until such time as the stops 9d engage against projections on the frame sides. Thereafter, the lower jaws will remain in a fixed position while the upper jaws continue to rise to a desired point. It will be noted that upward movement of the upper jaws may occur either as a result of an increase in the size of the roll as winding proceeds, or it may be carried out by the cylinders 24 and 26. Operation of cylinders 24 and 26 by solenoid S1 may be manually controlled by switch PB7, or by means of movement of a projecting part 36 against a limit switch L1 as suggested in FIGURE 10 and is hereinafter described in detail. Thus the first jaws will be disengaged when the partly wound roll reaches a predetermined size at which point part 36 engages limit switch L1.

It will be apparent, therefore, that a definite sequence of steps may be caused, including the steps of locating the jaws in a raised position and in separated relationship to receive a shell; closing the jaws and lowering the shell into a winding position; yieldably supporting the shell against the driving roll as the roll diameter increases; stopping the lower jaws at one point in a loading position; disengaging the upper jaws when the roll is partly wound; and simultaneously transferring the partly wound roll into a secondary winding position.

In the open raised position of the jaws, when the machine is first being started up and a shell member has been inserted by the transfer arms the operation of hand wrapping a cut end of cloth around the shell is carried out. In this raised position of the shell the stops 9d are engaged against the frame and the lower jaws can move no higher; also the upper jaws are raised to separate them from the lower jaws and define a space through which the shell spindles are free to move.

It is pointed out that the jaws will normally be located in a separated position with the shell occurring above the driving roll when the machine has been at rest and a winding operation is being started for the first time. The electromechanical means noted above actuates the pneumatic cylinders and locates the jaws and shell in a lowered starting position. Thereafter, a primary winding operation is carried out to form a partly wound roll as shown in broken lines in FIGURES 8 and 10, and also in full lines in FIGURE 9.

It will be seen that the shell handling apparatus now described, constitutes an improved and efficient means for carrying out a primary winding operation since a substantially uniform pressure may be exerted by means of the fluid cylinders as winding progresses and the roll diameter increases. In addition, the sequence of operations is especially advantageous in relation to two other steps which are next required in a continuous web winding cycle, including (a) transferring the partly wound roll W1 to a forward driving roll and cutting the web W when a fully wound roll is obtained and (b) inserting a new shell in the machine and mechanically engaging a cut end of cloth about the newly inserted shell.

In accordance with the robot winding method of the invention, we next provide for automatically transferring the partly wound roll W1 onto rolls 8a and 8b by means of the shell feeding transfer arms M12 earlier described. This mechansm, as shown in FIGURE 9, engages a new shell M6 against the partly wound roll W1 and as the arms move forwardly transfers the roll W1 into the broken-line position indicated in FIGURE 9. The point at which the transfer arms and shell M6 are actuated, is controlled by the electrical circuit of FIGURE 12.

When the partly wound roll W1 is displaced by transfer arms M12 into a secondary winding position as indicated in FIGURE 10, for example, it will be observed that the web W extends across the rolls 8 and 8a and remains in this relative position until the roll W2 is fully wound. In this position the web is conveniently held for cutting and we provide a gate cutting mechanism which is located below the web W in the position noted. The cutting mechanism comprises a vertically reciprocating knife support 14 normally referred to as a gate structure located between the rolls 8 and 8a and having fixed thereto a knife 18.

The knife 18 is normally supported in a position to lie below the driving rolls 8 and 8a as suggested in FIGURES 6 and 10, and is adapted to be raised upwardly to cut the web W, as suggested in FIGURE 8, when a fully wound roll has been completed on the forward driving roll 8b. As shown n FIGURES 6, 9 and 10, opposite extremities of the gate structure 14 are guided in some suitable manner as by channel means 16 in the frame sides 2 and 4.

Movement of the knife support or gate is controlled through a fluid cylinder 20 which is in the fluid pressure actuating system of FIGURE 11, earlier described. The cylinder 20 is located in the base of the machine frame as shown in FIGURES 6 and 10 and at its upper end is secured centrally of the gate structure 14 by a fastening 20a.

The knife 18 is formed of cutting sections 18a, 18b, 18c, etc., which are rigidly secured together as shown in FIGURE 7, but any one of which may be detached when the machine is stopped for sharpening or replacement by a new section. This is a highly desirable feature enabling an operator to avoid loss of time in repairing a faulty knife without the entire machine having to be taken apart. Frequent sharpening of the detached blade sections results in more positive cutting and no interruption of the machine operation.

We also construct the gate structure itself in a manner to impart greater strength and resistance to flexing or bending. The body of the gate structure is formed as shown in FIGURE 6 to constitute an elongated box section open on one side, and arranged so that two spaced apart side portions are presented to resist downward cutting pressure. We find this arrangement resists any tendency for bending or flexing to occur and undesirable distortion is avoided regardless of the kind of material to be cut.

In combination with the gate structure 14, we also provide roller fingers F adapted to bear against roll 8 and best shown in FIGURES 6 and 10 and also indicated in a lapping position in FIGURE 8. These fingers are employed to lap a cut end of the web W around a newly inserted shell, as noted in FIGURE 8, and are resiliently fixed to a shaft S by coiled springs and pivotally contained in suitable bearings fixed to the lower section of gate structure 14. The coiled springs anchored to the gate normally seek to hold the fingers in an extended position against the roll 8 as shown in FIGURE 10. At their extremities the fingers are formed with small bracket portions in which are mounted rollers O.

The fingers F are constructed with an extended arc of curvature chosen such that each of the rollers O may, in a raised position of the gate, such as that shown in FIGURE 10, extend over the peripheral surface of the shell 5 to a point where overlapping is positively insured. We find that by supporting these roller fingers in a raised position as described, we are enabled to wrap a cloth end around the shell in a positive manner so that lapping is assured and failure to engage the cloth is avoided.

In FIGURES 6, 8 and 10, there is further illustrated improved mechanism for receiving the partly wound roll W2 from the rear drum 8 as it is transferred by the transfer arms M12. Numerals 41 and 42 denote roll supporting arms rotatable on a shaft 43. The end of arms 41 and 42 are pivotally attached to fluid cylinders 41a and 42a which are in turn anchored inside respective frame sides 2 and 4. The fluid cylinders 41a and 42a normally support the arms 41 and 42 in a position such as that shown in FIGURE 6. In the position of FIGURE 6 the arms are adapted to yieldably receive the journals of a shell 5 and allow the partly wound roll to move gently into the secondary winding position without excessive shock.

FIGURE 7 shows the roll W2 moved into a forward position with the shell journals having been retained between a pair of guide plates 70 and 72. During the transfer of roll W2 into the secondary winding position, it will be apparent that the shell journals are disengaged and it is possible for the roll to become displaced in an axial direction. To prevent this and guide the roll properly, we provide the guide plates 70 and 72 and we further form these plates with flaring edges 70a and 72a. These plates and their flaring edges are spaced such that the shell journal extremities are necessarily caused to move into correct positions.

When the partly wound roll of cloth W2 has been guided by the arms 41 and 42 into a fully cradled position between the rolls 8a and 8b, as indicated in broken lines in FIGURE 6, the shell journals are immediately engaged by a pair of upper second jaws earlier noted. The upper second jaws are also mounted at the inner sides of the members 2 and 4. Each set of jaws consists of spaced rollers as 50 and 52 secured on jaw supports as 50a which are secured by racks as 53 slidably received at opposite sides of the machine in channel members as 54.

The racks 53 are engaged with gears 56 fixed at opposite ends of a shaft 58. A pair of pneumatic cylinders 60 and 62 located externally of the sides 2 and 4 are connected through slots 61 (FIGURE 3) in a manner similar to that of cylinders 24 and 26, to respective racks 53. The cylinders 60 and 62 are also controlled through the solenoid S4 and relay R5 as shown in the circuit of FIGURE 12, to raise the second jaws. When the cylinders are reversed, the jaws are lowered and come into register with and yieldably engage the journals of shell 5.

Winding in the secondary winding position when the roll W2 is secured by jaws 50 and 52 takes place and continues until the roll W is completed during which time the pneumatic cylinders are controlled to yieldably engage the rollers 50, 52 on the journals of shell 5 with a constant fluid pressure which insures a constant uniform winding operation and which prevents bumping of the roll or accidental displacement from the machine.

At a point at which the roll W is completed and the web has been cut the secondary jaws are raised and the doffing mechanism of the invention is operated. This doffing mechanism, as shown in FIGURES 6, 8 and 10, includes a doffing roll 80 which is located between the driving rollers 8a and 8b in a position to engage an underside of the roll W2 in a position such as that illustrated in broken lines in FIGURE 8. In a preferred form of the invention the axis of rotation of roll 8b is at an appreciably lower level than the axis of roll 8a. Also, the axis of rotation of the doffing roll 80 is arranged to lie parallel with but quite close to the axis of roll 8a. As a result, when the doffing roll 80 is raised, the roll of cloth W can move in one direction only, namely, outwardly of the machine.

To raise the doffing roll 80, we may provide another pneumatic cylinder 82 mounted centrally in the base of the winding machine as indicated in FIGURE 6. This cylinder is attached to a transverse member 84 of I beam section, for example. The I beam 84 has its opposite extremities slidably received in channel members as 86 on the inside of the frame sides 2 and 4 and the doffing roll 80 is connected to the beam extremities in some convenient manner.

Figure 12:
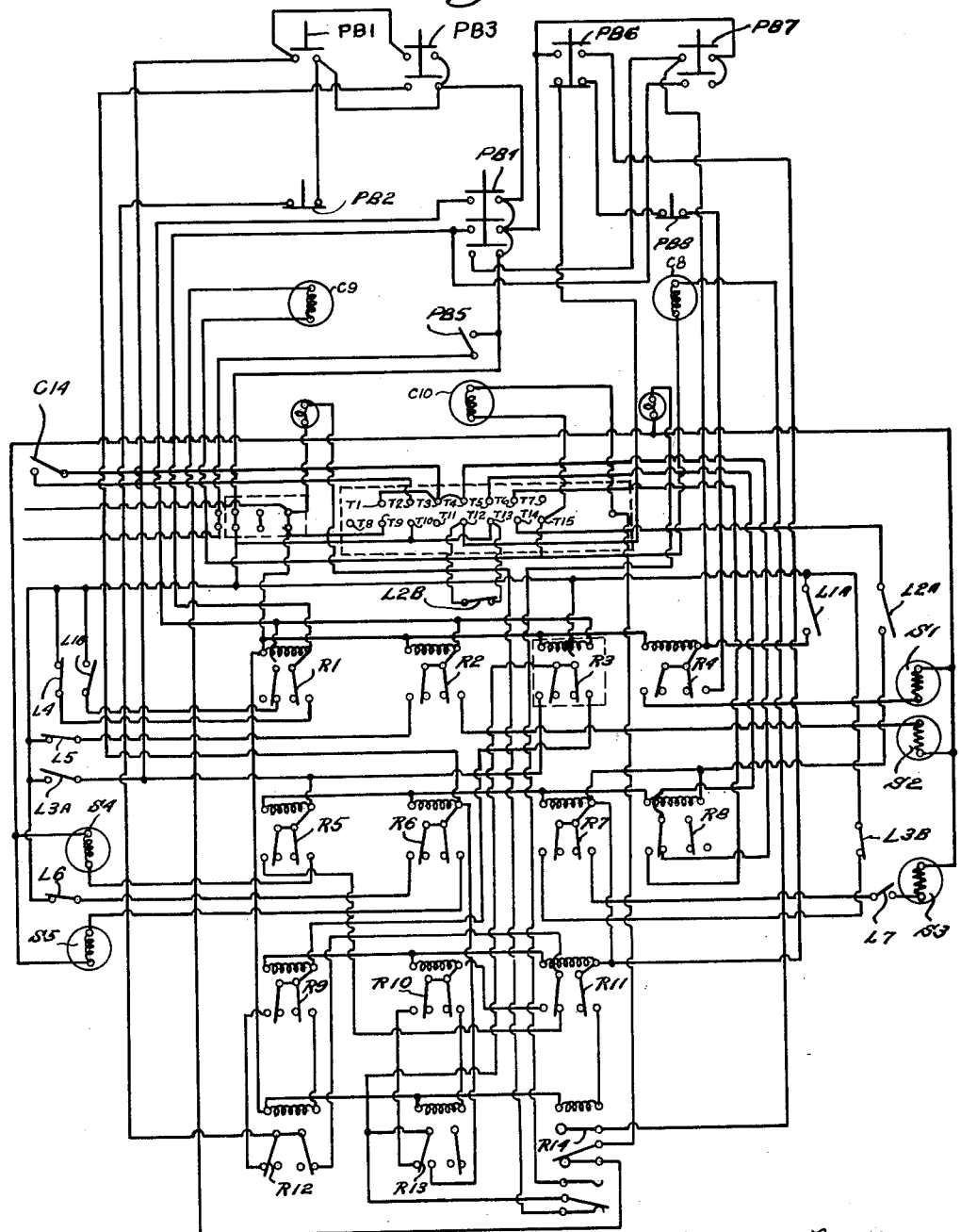
FIGURE 12 is a wiring diagram illustrating the electromechanical control arrangement which is employed in actuating the machine components.

To operate the doffing mechanism, we further provide an electrical control circuit, as shown in FIGURE 12, and hereafter noted in detail. Movement of the doffing roll 80 upwardly is also employed to reset the arms 41. This is accomplished by means of cam portion 90 formed along the edges of the arms 41 in a manner such that as the doffing roll rises it engages the cam portion and forces the arm into an upright position, with fluid in the hydraulic cylinders 41a being reversed in direction of flow and held until the next partly wound roll is received.

In addition to the mechanical components now described, the invention further includes a number of electrical control devices, including a number of limit switches, relays, solenoids and pushbutton type switches. Some of these devices are located in the machine and others are mounted in the separate control console K above-referred to and shown at the left hand side of FIGURE 3.

An important feature of these components and their arrangement, as shown in FIGURE 12, is the provision for fully automatic operation of all of the circuits when so desired and yet each of the circuits may be manually actuated.

Considering in detail the various machine operations which are carried out with the aid of the above-noted electrical control devices, it may be assumed that the machine is being started up at the beginning of a working period. The magazine M is loaded with shells, the number of yards wanted in a fully wound cloth roll is set in the predetermining counter C11 by turning dial C11a, and the main power switch PB5, as well as the automatic counter switch C14, are turned on.

Transfer load pushbutton switch PB4 is then closed thereby raising the first jaw to the loading position. Simultaneously, the shell feeding mechanism deposits a shell in the lower first jaws 9a and 11a. It is at this point that the machine operator manually laps an end of cloth around the shell as earlier described.

First jaw down switch, PB3, is thereafter pressed which lowers the shell into contact with the first driving roll 8. Winding commences and the control console takes over all further machine operations as noted below. When a predetermined size of roll has been wound, the limit switch L1 is actuated by the projection 36 and a circuit is closed energizing the relay R4 and solenoid S1 which causes the cylinders 24 and 26 to raise the first jaws into a fully opened position and the shell journals are released. Also initiated by closing of limit switch L1 is operation of a transfer load circuit in which there is a transfer relay R2 controlling a transfer solenoid S2. Relay R3 also operates a second jaw relay R5 controlling a second jaw solenoid S4. The second jaws are thus automatically raised into a position to receive the partly wound roll and at the same time the transfer load mechanism automatically transfers the partly wound cloth roll from the first to the second winding position and, at the same time, deposits a new shell in the first jaws.

A limit switch L5 holds the transfer-load circuit in operation until it is actuated by the transfer arms at the end of the forward stroke. L5 then operates to return the transfer arm to a retracted position. Also provided is a transfer lock-out relay R1 to prevent a double cycling of the transfer mechanism. The limit switch L4 when actuated by upper jaw releases the lockout.

The second jaws are designed to lower themselves after a time delay which is provided through a pair of relays R9 and R12. After the time delay noted, the jaws are automatically lowered into engagement with the journals of the transferred roll, while the lower first jaws are maintained in a raised position to support the newly deposited shell above and clear of the web travel line.

It is pointed out that in typical winding operations with which the present invention is concerned, the cloth may be furnished in lots of varying lengths some of which may be as long as several thousand yards. It will be appreciated that it frequently becomes desirable for the operator to know when the end of a lot is being approached in order to make preparation for properly starting a new lot of cloth.

It should also be understood that a lot of cloth may be made up of several sections of cloth which have been stitched together at varying intervals of from 100 yards up to 150 yards or more. Moreover, when a roll of wound cloth is completed, in some desired size, it is necessary to cut the cloth and it is important to make the cut come as near as possible to a seam formed where two lengths of cloth have been sewed together. This prevents undue waste of cloth.

It is a material aid to an operator to have the yards of cloth counted continuously as the cloth becomes wound in the machine. This is so for the reason that an operator can determine when the end of a lot is nearly at hand and this information can be communicated to operators of subsequent processing steps.

Finally, in addition to keeping a total yardage count realized from any given lot of cloth, it is desirable to keep separate measurements of the exact number of yards of cloth going into any given roll wound on the machine. Still further the counting operation as hereinafter described can provide for a predetermined size of roll being wound. In this latter case, by utilizing a seam detector combined in accordance with the invention, it becomes possible to make the cut occur near a seam. For example, if the counter for a predetermined size of roll to be wound is set to make approximately a thousand yard roll, the additional yardage involved in coming to a seam might be fifty yards and thus the total yards in the roll would be a thousand and fifty yards.

Winding in the secondary winding position then proceeds and continues until the automatic counter reaches the preset yardage counter number. When this number is reached, the counter gives partial energization of the first jaw down circuit and the cut circuit as shown in FIGURE 12. The first seam following the preset number being reached actuates limit switch L2 and completes the first jaw circuit to lower the first jaws and also completes the cut circuit to energize the cut relay R7. These circuits are shown in FIGURES 12 and 16. The counting mechanism includes a switching device shown in FIGURE 16, which device is defined to send an electrical signal to a standard type of electrical counter C11 which may, for example, be a counter of the type commonly referred to as a "Veeder-Root" counter manufactured and sold by Veeder-Root Inc. of Danvers, Massachusetts.

The switching device of FIGURE 16, also described elsewhere, consists of a one foot circumference measuring wheel C2 which rides against roller C1 as roller C1 is rotated by cloth passing into the winding machine. The one foot circumference wheel C2 is connected to a pinion gear C7 which drives a spur gear C6 at a ratio of one revolution of gear C6 per three revolutions of gear C7 to give one actuation of the micro switch in FIGURE 15 for each yard of fabric which passes on roll C1.

The impulse generated by the micro switch of FIGURE 15 is transmitted to an electro-magnetic counter C11, which essentially consists of two series of stepping switches of well-known type C11a. C11a is the predetermining series of stepping switches which is preset before machine operation for the number of yards which are required in the cloth roll. C11b (FIGURE 14) is the indicating series of stepping switches which, when the numbers match the numbers on C11a, complete an operating circuit to close a relay and to permit an impulse from seam detector switch L2 to be passed to cut relays R7 and R11. These relays are then operated by the seam detector switch L2 when the next seam passes between roller D2 (FIGURE 3) and roller D10 to operate limit switch L2.

Basically, the function of counter C11 is to maintain the cutting circuit in a de-energized condition so that the seam detector switch L2 will not energize the cutting circuit until the preset yardage has been rolled onto the cloth roll. At that time counter C11 partially energizes the cutting circuit permitting the next operation of seam detector switch L2 to operate the cutting knife.

At the same time seam detector switch L2 de-energizes the first jaw circuit to lower the first jaws along with the shell into contact with the first winding drum for the cutting operation. It does this by breaking the holding circuit which has been holding first jaw relay R4 to maintain the first jaw and the shell in the raised position thereby preventing the shell from damaging several yards of fabric by rotating against the fabric under pressure before the actual cut is made. When the first jaws reach a down position, limit switch L7 allows current to pass from the cut relay R7 to cut solenoid S3 to complete this circuit. The cutting mechanism then rises and severs the cloth. The cut circuit is also operated through the pushbutton switch PB6 which, when closed, energizes relays R11, R7 and R8. R8 acts as a single pole double throw switch to reset the predetermining counter to zero. R11 operates to actuate switching relay R14 to switch from one batch counter to the other batch counter, and from a respective indicating light for the first batch counter to a respective indicating light for the second batch counter. R11 also activates R10 and R13 to place measured time delay in the operation of the doff mechanism. R11 also operates to break a holding circuit in the second jaw circuit to cause the second jaws to drop and grip the cloth roll in the second position if they are in the up position. This puts the roll under pressure and prevents the cloth from being pulled back when the knife meets the cloth, thus acting as a safety circuit. R7, in addition to operating the cut solenoids S3, also provides the holding circuit through cut return limit switch L3, which is broken when the knife comes to the end of its upward stroke. Relay R5 simultaneously causes the predetermining counter to reset itself for the new roll. Limit switch 7, prevents the knife from cutting before the first jaws are down.

During the period in which cutting takes place, as described above, the finger mechanism moves into a position to lap the cut edge of cloth around a new shell and, at this time, the doffing mechanism operates to eject the finished roll.

The doffing circuit controls a doffing solenoid S5 (FIGURE 1). The circuit includes a pushbutton switch PB3 which, when actuated, energizes relays R6, R10 and R13. R6 energizes solenoid S5 and allows power to pass from L6 to R6 to hold the circuit. L6 is shown in FIGURE 10. Actuation of L6 by the doff roll rising to the top of its stroke, breaks the holding circuit to R6, returning the doff roll to the retracted position. R10 and R13 are operated by R11 of the cut circuit.

The robot winding method of the invention continues to cycle completely automatically throughout the rest of the working period and as each new roll starts, lapping of a cut end of cloth on a newly deposited shell is taken over and done automatically by means of the lapping fingers which are timed to operate immediately after the cutting step takes place. The counter circuit at the start of each new roll also shifts from one batch counter to the other as noted above.

At the completion of a roll the operator of the machine reads the yardage recorded on the batch counter which has finished its record and the yardage is marked on a roll ticket. The operator then actuates the number one batch counter reset button and attaches the ticket to the roll. During this time the number 2 batch counter is recording for the second roll of cloth which is being formed. The lot counter measures constantly the amount of cloth which is processed through the machine so that a record of the total number of yards during the working period is provided.

Considering in more detail the electrical circuit shown in FIGURE 12, it will be understood that a terminal member is mounted in the console K to which an A.C. power supply is connected. Also, the pneumatically powered devices are connected to a fluid pressure line, such as an air line under pressure, for example, of 80 p.s.i.

The power line runs to on-off switch PB5, from the on-off switch to a transfer load switch PB4, to a doffing switch PB3; to a second jaw-up switch PB1; to a second jaw-down switch PB2. Also from transfer load switch PB4 power goes to the cut switch PB6 and from PB6 to first jaw-up switch PB7; from on-off switch PB5 power also goes to a predetermining counter terminal, then to another terminal, back to the first terminal strip, then to a terminal on the machine itself and connects to relays R3, R13 and R14.

From relay R14 power goes to indicating lights on the control console. From the machine connection socket power also goes to limit switches L3, L6, L4 and L5. The result of this arrangement is that when power is turned on machine operation can be initiated by pressing PB1, PB3, PB4, PB6, PB7, or by operation of L3, L6, L1, L4, or L5. The predetermining counter C11 can be on or off by reason of its own switch C14.

The counting head circuit is shown in detail in FIGURE 16 and runs from the predetermining counter to the counting head contacts and then back to the predetermining counter and includes a make or break type of switch using standard automotive contact points set for 180° dwell. The counting head energizes and deenergizes the magnetic coils of the operating counters to drive their counting mechanisms. In this counter circuit are dependent relay switches RY1A, RY1B and RY1C together with counting wheel switches as noted at the upper side of FIGURE 16.

All counters are operated by direct current provided from the rectifier in the predetermining counter. The D.C. circuit is a separate circuit from the A.C. line and is indicated separately in the drawings. Terminals T1–T16 are indicated on FIGURE 16 at the lower side thereof and these same terminals T1–T16 are further shown in the upper portion of FIGURE 12. A common line is fed from the predetermining counter to the common terminal of relay R14 and from the common terminal feeds to which ever batch counter happens to be operating at any given time. Direct current is also fed from the predetermining counter direct to the lot counter at all times.

The reason for furnishing both a lot counter and two batch counters, is to deal with the requirement for two types of load. Fabric is normally processed by lot and a lot may contain many thousands of yards. Each roll of cloth wound on the machine may, however, include only two thousand yards which must be measured and marked on a roll ticket for reference in further processing.

To deal with this dual requirement, two batch counters are provided and set up so that one batch counter may record the yardage in a roll which is being wound, while the other batch counter is inoperative. When the roll is finished and the cloth is cut, relay R14 switches over to connect the other batch counter in an operative position, leaving the total number of yards which have been wound in the doffed roll recorded on the now inoperative batch counter.

However, the mill operator knows the approximate number of yards in a lot being processed and will wish to separate one lot from the following lot during the running of the machine. The provision of a separate lot counter lets the mill operator record the total number of yards in the lot and, at the same time, the operator by watching the total being recorded, is given a warning when the end of the lot is at hand so that they can watch for the change and separate the lots. This mechanism also gives the operator an opportunity to check on the previously recorded total yardage in the lot.

It will be apparent from the invention as now described, that we have provided an automatic method of web winding in which shells are mechanically fed from a magazine into an operative position and robot winding continues from the primary winding position to the secondary winding position and at the start of secondary winding a replacement shell is deposited simultaneously. Also cutting, doffing, lapping and the start of a new winding operation are all mechanically induced in timed relationship to one another. In addition to this robot method of winding, we have further provided novel control devices consisting of counting and seam-detector members which desirably control the travel of cloth, as well as measuring the amounts of cloth in the successive rolls and in the total number of rolls wound. I may also desire to operate the shell magazine mechanism in various other ways as, for example, by means of the counter mechanism without the seam checking apparatus, or independently of any counter mechanism relying upon the stage of winding which is taking place. Simultaneously the combination of counters disclosed may be used with other winding mechanisms and the counters may be connected to control the knives directly.

The invention has been described with reference to cloth. However, it should be understood that the robot winding method may be practiced with respect to handling of other sheet materials of either fibrous or non-fibrous nature, and various changes and modifications may be resorted to in connection with the contsruction and arrangement of the disclosed parts within the scope of the appended claims.

We claim:

1. In a machine for winding a roll of cloth, said machine having a plurality of cloth winding rolls, shell means supported above the rolls, lapping means for engaging a cut end of cloth around the shell means, pressure controlled jaws for positioning said shell means relative to the widing rolls, knife means for cutting the web when a roll of cloth is completely wound, means for doffing the roll after cutting takes place, shell feeding mechanism for periodically delivering a fresh shell means to the said jaws, power means for operating said parts, counter means actuated by movement of the cloth through said machine, means operated by said counter means for operating said power means, and second counter means for automatically operating the said pressure controlled jaws, knife means, doffing means and shell means to form a series of cloth rolls of a predetermined size from a continuous web of cloth.

2. In a web winding machine of the class having a plurality of winding rolls, shell means for receiving therearound a cut end of a web of cloth and supporting the web in rolling contact with one of the winding rolls, pressure controlled jaws for positioning said shell means relative to the widing rolls, knife means for cutting the web when the cloth is completely wound, means for doffing the wound shell means after cutting takes place, a counter mechanism including a mechanical counter device constructed and arranged to engage in rolling contact with the said web of cloth during forward travel thereof, electrically operated measuring means responsive to movement of the counter device for measuring the number of unit lengths of said web of cloth which are wound on the said shell means in a roll of any desired size, and means actuated by said measuring means for operating said knife means for cutting the web of cloth when the roll is completely wound.

3. A structure as defined in claim 2 in which the mechanical counter device comprises a counter frame secured on said machine at the cloth entering side thereof and having a cam roller member supported thereon, a cam element fixed to said roller, a cloth engaging roll arranged in rolling contact with the said cam roller and an electrical counting switch responsive to movement of said cam element.

4. A structure according to claim 2 in which the electrically operated measuring means includes electrical relay means for actuating the cutting knife means when a roll of predetermined size is wound on said shell.

5. A structure according to claim 4 in which the electrically operated measuring means further includes a seam detecting device and means responsive to the seam detecting device for energizing the said electrical relay means for the cutting knife means.

6. In a web winding machine of the class having a plurality of winding rolls, shell means for receiving therearound a cut end of a web of cloth and supporting the web in rolling contact with one of the winding rolls, pressure controlled jaws for positioning said shell means relative to the winding rolls, knife means for cutting the web when the cloth is completely wound, power means for actuating said knife means and means for doffing the wound shell means after cutting takes place, a counter mechanism, said counter mechanism including a mechanical counter device constructed and arranged to engage in rolling contact with the said web of cloth during forward travel thereof, electrically operated measuring means responsive to movement of the counter device for measuring the number of unit lengths of said web of cloth which are wound on the said shell in a roll of any desired size, said electrically operated measuring means comprising a counter register mechanism including batch counter means for denoting the number of unit lengths of cloth in each roll wound on the machine and lot counter means for denoting the total number of unit lengths of cloth in a series of rolls wound on the machine, and means connecting said power means and electrically measuring means for actuating said knife means after a predetermined number of unit lengths of cloth have been provided on a roll and prior to the doffing of said roll.

7. A structure according to claim 6 in which the batch counter means includes two counter devices and means for selectively operating the two counter devices in alternating relationship.

8. In a web winding machine of the class having a plurality of winding rolls, shell means for receiving therearound a cut end of a web of cloth and supporting the web in rolling contact with one of the winding rolls, pressure controlled jaws for positioning said shell means relative to the winding rolls, knife means for cutting the web when the cloth is completely wound, mean for doffing the wound shell means after cutting takes place, electromechanical means for selectively operating the jaws, the cutting knife means and doffing means in a predetermined sequence, a shell feeding mechanism for periodically depositing a fresh shell means in the jaws, a counter mechanism for denoting when a roll of cloth is wound to a desired size, a seam detecting device cooperating with the counter mechanism for actuating the cutting knife means and doffing means, and electrical control console including electrical circuits and electrical switches for automatically programming the jaws, knife means and doffing means in a desired sequence of operation.

9. A structure according to claim 8 in which the shell feeding mechanism is operated by means operated by the size of a partly wound roll, and said knife means and doffing means are operated by means operated by a preset cumulative unit length measurement made by the said counter mechanism.

10. A structure according to claim 9 in which the said electrical circuits and electrical switches including limit switches mounted in the machine for regulating movement of the jaws, cutting knife means and the doffing means.

11. A machine for winding rolls of sheet material from a supply web, said machine embodying three spaced driving rolls for a primary winding operation on the first and second driving rolls, the partially wound roll being thereafter automatically transferred to the second and third driving rolls for a secondary winding until a predetermined length of sheet material is wound thereon, a hopper for holding a plurality of winding shells, transfer arms for selecting a shell from said hopper and moving the same to an initial position for the primary winding operation, automatic means for actuating the transfer arms to select a second shell from said hopper and to move said second shell into a position to engage the partailly wound roll on the first shell to urge said partially wound shell to its secondary winding position between the second and third driving rolls for a complete winding operation, automatic means including driving motors and control circuits therefor for recycling the movement of said arms to sequentially select additional shells and move the shell positioned in said arms to displace the partially wound shell in the first winding position to the second winding position, and means for doffing the completely wound shell from its secondary winding position.

12. The structure of claim 11 characterized in that a cutting knife is provided, said cutting knife being located at a point adjacent the initial position of the shell, and additional means are provided for automatically attaching the terminal portion of the web to the shell to permit a continuous winding of a second roll from the supply web.

13. The structure of claim 11 characterized in that a severing device is provided for severing the web of sheet material after the roll has reached a predetermined size, the operation of said severing device being synchronized with the movement of said transfer arms and being operated through a motor controlled by a measuring device responsive to the movement of a mechanical counter constructed and arranged to engage in rolling contact with the web of sheet material during its forward travel.

14. The structure of claim 11 characterized in that means are provided for automatically recording the yardage total by a lot counter and alternate counts are made by batch counters for each roll of sheet material wound.

15. In a web winding machine of the class having a plurality of winding rolls, shell means for receiving therearound a cut end of a web of cloth and supporting the web in rolling contact with one of the winding rolls, pressure controlled jaws for positioning said shell means relative to the winding rolls, knife means for cutting the web when the cloth is completely wound, means for doffing the wound shell means after cutting takes place, and a counter mechanism, said counter mechanism including a mechanical counter device constructed and arranged to engage in rolling contact with the said web of cloth during forward travel thereof and electrically operated measuring means responsive to movement of the counter device for measuring the number of unit lengths of cloth which are wound on the said shell means in a roll of any desired size, said electrically operating measuring means comprising a counter register mechanism including a pair of batch counters for denoting alternately the number of unit lengths of cloth in each successive roll which is wound on the machine, a lot counter for denoting the total number of unit lengths of cloth in a plurality of rolls wound on the machine, a predetermining counter for controlling the number of unit lengths of cloth which are to be wound in any given roll, and dial means for manually adjusting said predetermining counter to a desired setting, the electrically operated measuring means controlling the actuation of the knife means for cutting the web of cloth when the roll is completely wound.

16. In a web winding machine of the class having a plurality of winding rolls, shell means for receiving therearound a cut end of a web of cloth and supporting the web in rolling contact with one of the winding rolls, pressure controlled jaws for positioning said shell means relative to the winding rolls, knife means for cutting the web when the cloth is completely wound, means for doffing the roll after cutting takes place, a seam detecting device for observing the occurrence of a seam in said web of cloth, said seam detecting device including a fixed roll arranged to engage against said web of cloth at an upper side thereof, a pivoted lower roll support having a roll supported at the lower side of the web, means for resiliently urging the lower roll and web against the fixed roll, an electrical switch means arranged to be actuated when the pivoted roll is displaced by passage of a seam between the rolls, said switch means controlling the operation of said pressure controlled jaws, knife means and doffing means.

References Cited in the file of this patent

UNITED STATES PATENTS

| | | |
|---|---|---|
| 1,077,040 | Childs | Oct. 28, 1913 |
| 1,211,058 | Bischoff | Jan. 2, 1917 |
| 1,238,798 | Mansfield | Sept. 4, 1917 |
| 2,171,667 | Mickelson et al. | Sept. 5, 1939 |
| 2,525,509 | Pugh | Oct. 10, 1950 |
| 2,682,379 | Piper et al. | June 29, 1954 |
| 2,989,262 | Hornbostel | June 20, 1961 |
| 3,049,311 | Birch | Aug. 14, 1962 |
| 3,112,085 | Rochla | Nov. 26, 1963 |

FOREIGN PATENTS

| | | |
|---|---|---|
| 804,904 | Germany | May 4, 1951 |